United States Patent [19]
Brugger et al.

[11] Patent Number: 5,383,833
[45] Date of Patent: Jan. 24, 1995

[54] ROLL FOR HEATING OR COOLING RUNNING WEBS

[75] Inventors: Hubert Brugger, Baindt; Karl-Heinz Enderle, Weingarten; Harald Hess, Grünkraut; Frank Isele, Horgenzell; Horst Senser, Bergatreute; Rolf Wenske, Ravensburg-Torkenweiler, all of Germany

[73] Assignee: Sulzer-Escher Wyss GmbH, Ravensburg, Germany

[21] Appl. No.: 91,325

[22] Filed: Jul. 14, 1993

[30] Foreign Application Priority Data

Jul. 16, 1992 [DE] Germany ............... 4223359

[51] Int. Cl.6 ............................... B21B 13/02
[52] U.S. Cl. ............................... 492/16; 492/46
[58] Field of Search ............... 492/46, 16, 7; 165/90

[56] References Cited

U.S. PATENT DOCUMENTS

| | | | |
|---|---|---|---|
| 4,498,527 | 2/1985 | Gerarts et al. | 492/46 |
| 4,607,420 | 8/1986 | Vomhoff | 492/46 |
| 4,658,482 | 4/1987 | Schönemann | 492/46 |
| 4,757,584 | 7/1988 | Pav et al. | 492/46 |
| 4,955,433 | 9/1990 | Zaoralek | 492/46 |
| 4,964,202 | 10/1990 | Pav et al. | 492/46 |
| 5,010,633 | 4/1991 | Brown et al. | 492/46 |
| 5,152,333 | 10/1992 | Barbe et al. | 492/46 |
| 5,206,978 | 5/1993 | Pav | 492/46 |
| 5,279,535 | 1/1994 | Hawes et al. | 492/46 |

FOREIGN PATENT DOCUMENTS

| | | |
|---|---|---|
| 1244097 | 7/1967 | Germany . |
| 1952900 | 4/1971 | Germany . |
| 3140425 | 10/1988 | Germany . |
| 3014891 | 11/1989 | Germany . |
| 3838726 | 5/1990 | Germany . |
| 3925367 | 2/1991 | Germany . |
| 9014117 | 3/1992 | Germany . |

*Primary Examiner*—Irene Cuda
*Attorney, Agent, or Firm*—Darby & Darby

[57] ABSTRACT

The end portions of a rotary shell forming part of a calendar roll can be heated or cooled by a suitable (gaseous or hydraulic) fluid which is admitted into axially parallel first channels of the shell. Such channels can extend from end face to end face of the shell or only in the region of one end face each. The first channels receive the fluid from second channels which extend radially inwardly to the internal surface of the shell, and spent fluid is admitted into third channels which extend from the respective first channels to the internal surface of the shell. The first channels accommodate axially adjustable throttles which are used to regulate the rate of fluid flow in the shell and to thus regulate the temperature of the respective end portions of the shell.

14 Claims, 2 Drawing Sheets

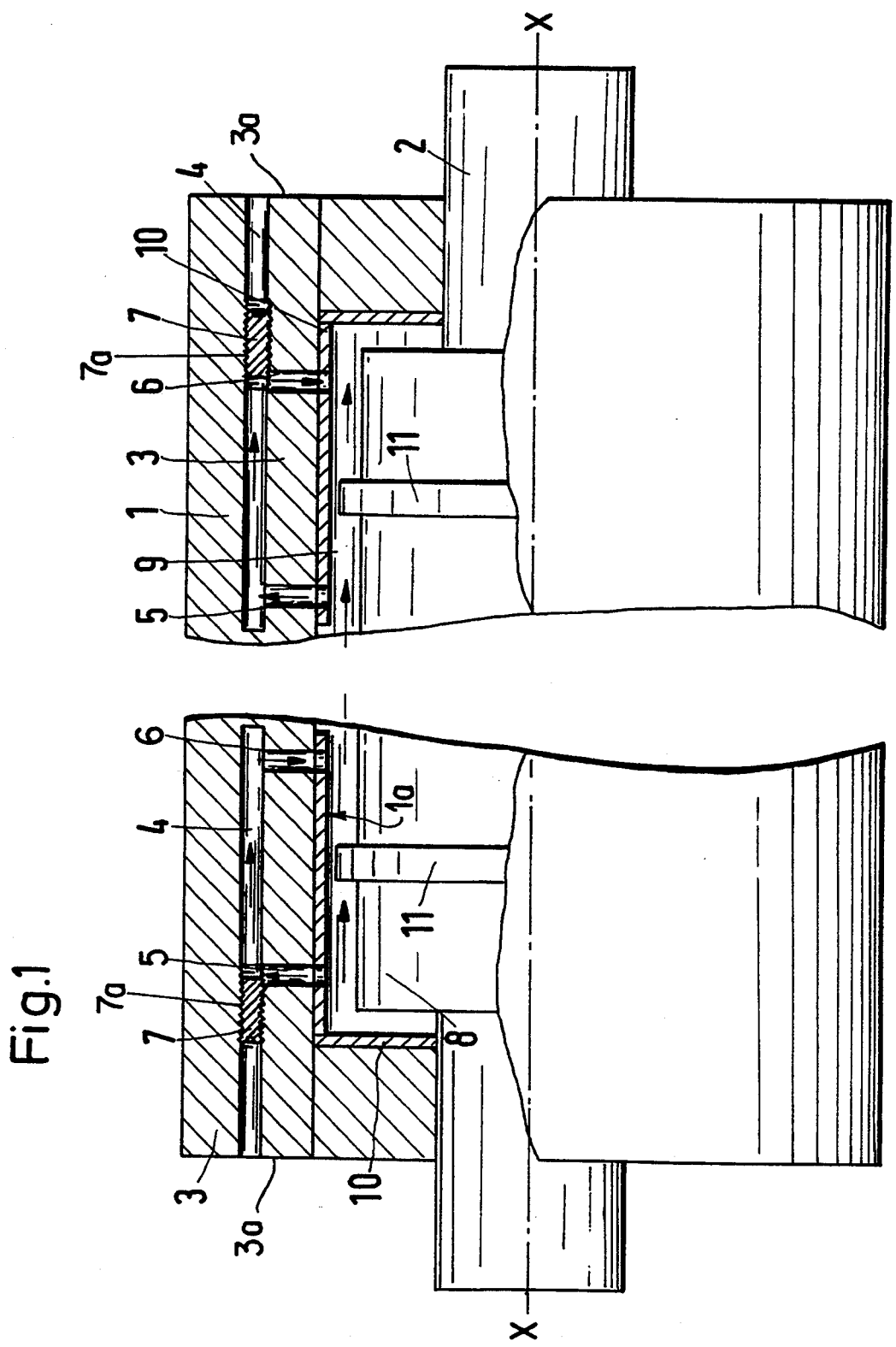

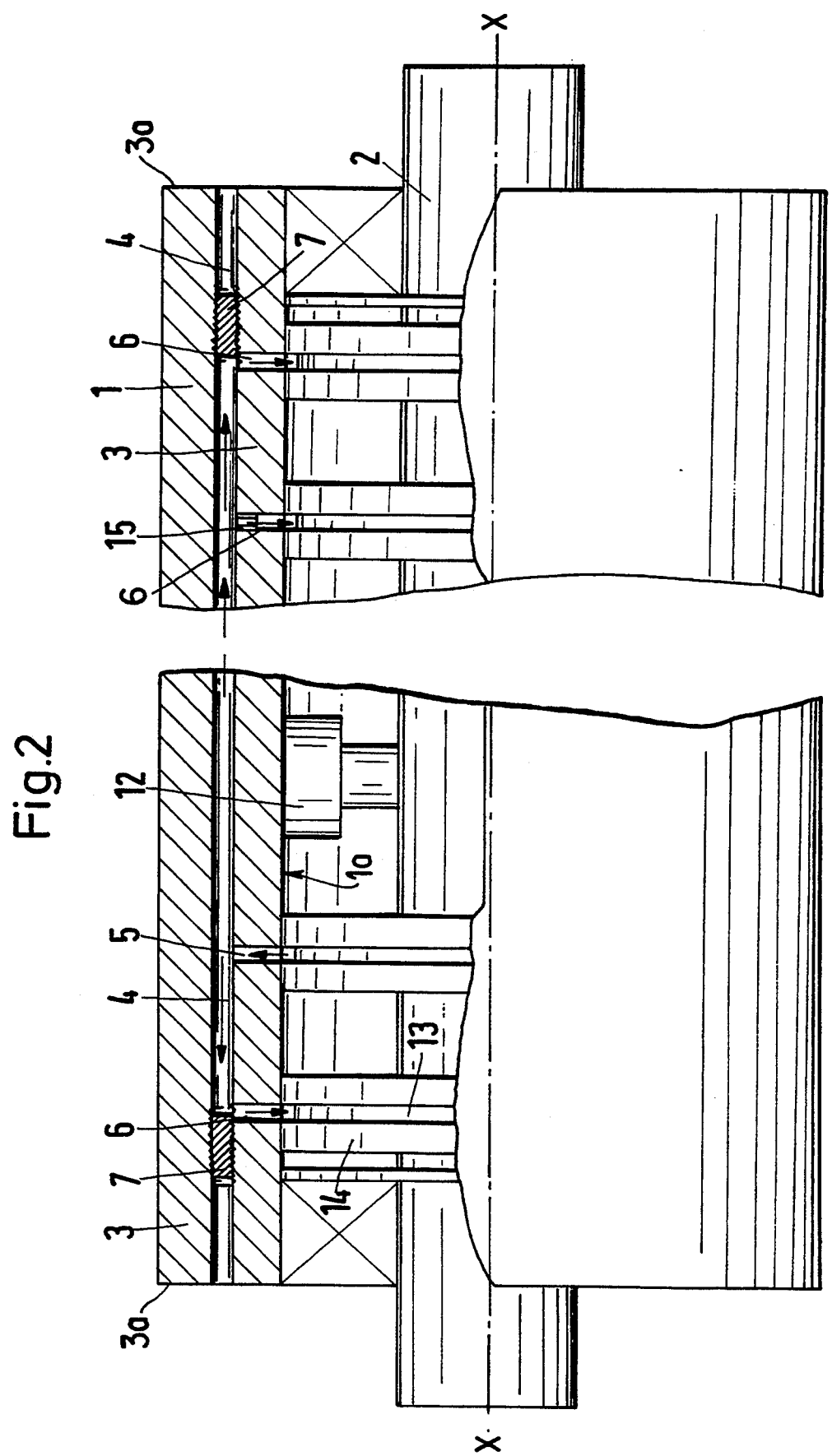

ROLL FOR HEATING OR COOLING RUNNING WEBS

BACKGROUND OF THE INVENTION

The invention relates to improvements in rolls which can be used in calenders or in analogous machines to heat or cool running webs of paper or the like. More particularly, the invention relates to improvements in rolls of the type wherein a rotary shell surrounds and is centered on a stationary carrier and has a peripheral surface which cooperates with the peripheral surface of an identical or different roll to define a nip for the passage of a running web of paper, textile material, metallic or plastic foil or a composite web having two or more overlapping layers of paper and/or other sheet material.

Published German patent application Serial No. 38 38 726 discloses a roll having a rotary shell which can be used to heat or cool a running web of paper or the like. The shell is rotatable around a stationary carrier and is rotatably journalled on the carrier by one or more supporting elements and is provided with axially parallel bores which are adjacent to its peripheral surface and can be used to convey streams or flows of a heating or cooling fluid. Heating or cooling fluid is supplied and evacuated through a space between the peripheral surface of the stationary carrier and the internal surface of the shell, and through one or more bores in the carrier. A drawback of the just described roll is that it does not permit highly predictable and accurate cooling or heating of the end portions of the shell. Consequently, the heating or cooling system of such roll cannot reliably prevent the development of the so-called oxbow effect which involves deformation of end portions of the rotary shell. This, in turn, affects the quality of the marginal portions of the running web. Thus, the luster and/or smoothness of the marginal portions of the treated web is likely to be less than satisfactory and the thickness of such marginal portions is likely to fluctuate within a rather wide range.

German Pat. No. 30 14 891 discloses a roll employing a rotary shell and a displacing element which latter is confined in the shell. The patent proposes to solve the problem of adequately influencing the temperature of the end portions of the shell (i.e., of the marginal portions of a web which is being treated as a result of contact with such shell) by utilizing two heat carrying fluid streams which are maintained at different temperatures. A drawback of the patented roll is that its initial cost and its maintenance cost are rather high. Furthermore, it is difficult to adequately (predictably) mix the two fluid streams in an annular space between the external surface of the confined displacing element and the internal surface of the shell.

German Utility Model No. 90 14 117.2 discloses a roll wherein the temperature of the rotary shell can be influenced by conveying a fluid medium through axially parallel channels which are adjacent the peripheral surface of the shell and alternate with axially parallel channels for evacuation of spent fluid medium. The Utility Model further proposes the utilization of a distributor which is installed at one end portion of the shell and comprises means for directing freshly supplied fluid medium as well as spent medium into selected channels at the periphery of the shell. A drawback of the just outlined roll is that it cannot heat or cool the marginal portions of a running web with a requisite degree of reliability.

German Auslegeschrift No. 1 244 097 proposes a roll having a shell whose peripheral surface can be heated by a pressurized fluid. Such fluid is confined in a chamber which is directly surrounded in part by a stationary carrier for the shell, in part by a stationary cylinder which is installed between the carrier and the shell, and in part by a set of pipes which are recessed into the core and are overlapped by sealing strips received in the recesses of the carrier. The roll which is disclosed by this publication is complex and expensive and cannot ensure reliable and reproducible heating of each and every portion of a running web of paper or any other material contacting the peripheral surface of the shell.

Published German patent application Serial No. 1 952 900 discloses a roll adapted to be heated by oil which is admitted into and is evacuated from the roll through axially disposed inlet/outlet means. The relatively thin shell of the roll surrounds a rotary core and defines with the latter a helical channel for the flow of heating fluid. The channel receives fresh fluid from and discharges spent fluid into radially extending bores of the core. The just described roll is expensive and is not capable of ensuring highly accurate heating or cooling of the marginal portions of a running web of paper or the like.

German patent No. 31 40 425 discloses a heatable roll wherein the end portions of a rotary shell are connected with two separately produced sleeves serving as a means for admitting fresh heating fluid into and for evacuating spent heating fluid from an annular clearance which is defined in part by a displacing element in the shell. The patented roll exhibits the same drawbacks as the previously described conventional rolls.

Published German patent application Serial No. 39 25 367 discloses a roll which is used to treat running webs as a result of the application of heat and pressure. The rotary shell of the roll is provided with axially parallel channels for the flow of a heating medium close to the peripheral surface of the shell from and into bores which are machined into the stationary core for the shell. A drawback of such roll is that it cannot ensure adequate heating or cooling of the end portions of the shell.

OBJECTS OF THE INVENTION

An object of the invention is to provide a roll which is constructed and assembled in such a way that it can adequately heat or cool each and every portion of a running web of paper or other sheet material of the type normally treated in a calender or an analogous machine.

Another object of the invention is to provide a simple and inexpensive roll of the above outlined character.

A further object of the invention is to provide a calender or an analogous machine which embodies one or more rolls of the above outlined character.

An additional object of the invention is to provide a roll which is constructed, assembled and mounted in such a way that the temperature of one or more selected portions of a running web of paper or the like can be adjusted or regulated with a high degree of accuracy and reproducibility.

Still another object of the invention is to provide a roll which can be installed in existing calenders or like machines as a superior substitute for heretofore known and used rolls.

A further object of the invention is to provide a novel and improved method of heating or cooling one or both end portions of a rotary shell in a roll of the above outlined character.

Another object of the invention is to provide novel and improved means for regulating or adjusting the temperature of one or more selected portions of a calender roll.

An additional object of the invention is to provide a roll wherein the provision of effective temperature regulating means does not contribute to complexity and cost of such device.

Still another object of the invention is to provide a novel and improved rotary shell for use in a roll of the above outlined character.

A further object of the invention is to provide a roll which ensures optimal treatment of the marginal portions of running webs of paper, textile material, metallic foil, plastic foil and/or like webs which are to be subjected to precision smoothing, polishing, flattening or like treatment.

Another object of the invention is to provide a roll which ensures that the thickness of each marginal portion of a running web of paper or the like can be reduced to a preselected value with a high degree of predictability and reproducibility.

SUMMARY OF THE INVENTION

The invention is embodied in a roll which can be utilized in a calender or a like machine to treat running webs of paper or other sheet material. The improved roll comprises a shell which is rotatable about a predetermined axis and has first and second end portions. The roll further comprises means for varying the temperature of at least one of the two end portions, and such temperature varying means comprises at least one first channel which is provided in the shell and extends in substantial parallelism with the predetermined axis, at least one second channel which is provided in the shell and serves to admit a conditioning (heating or cooling) fluid into the at least one first channel, at least one third channel provided in the shell and serving to withdraw or permit evacuation of conditioning fluid from the at least one first channel, and at least one adjustable throttle in at least one of the channels.

The shell has an internal surface, and the second and third channels preferably extend between such internal surface and the at least one first channel substantially radially of the predetermined axis.

One of the channels including the at least one second channel and the at least one third channel is nearer to the at least one end portion of the shell than the other of these second and third channels, and the at least one first channel can include a portion which is provided in the at least one end portion of the shell. The at least one throttle can be disposed (at least in part) in such portion of the at least one first channel.

The shell and the at least one throttle can include complementary means (such as mating male and female threads) for moving the at least one throttle in the at least one first channel in response to rotation of the at least one throttle in the general direction of the predetermined axis.

The roll can further comprise an insert which acts not unlike a displacing element and defines with the internal surface of the shell an internal space which surrounds the displacing element and defines a path for the flow of a heat exchange or conditioning fluid substantially in the direction of the predetermined axis.

A thermally insulating liner can be installed in the internal space to overlie the internal surface of the shell, at least in the region of the at least one end portion of such shell.

The roll can be further equipped with at least one flow restrictor which is provided in the aforementioned internal space between the at least one second channel and the at least one third channel, as considered in the direction of the predetermined axis.

The at least one first channel can extend all the way from one end face to the other end face of the respective end portion.

The shell can be provided with a single second channel and with three channels for the at least one first channel. The one second channel can be disposed between two of the third channels, as seen in the direction of the predetermined axis. Such roll can further comprise a second throttle in one of the third channels. The just mentioned one channel (namely one of the third channels) can be disposed between two other second and third channels, as seen in the direction of the predetermined axis.

The shell can further comprise at least one additional second channel and at least one additional third channel at the other of the two end portions.

A stationary carrier of the improved roll can be surrounded by the rotary shell. The carrier and the shell normally define an internal space, e.g., when the configuration of the shell is to be controlled by one or more sets of hydrostatic supporting elements.

The novel features which are considered as characteristic of the invention are set forth in particular in the appended claims. The improved roll itself, however, both as to its construction and the mode of using the same, together with additional features and advantages thereof, will be best understood upon perusal of the following detailed description of certain presently preferred specific embodiments with reference to the accompanying drawings.

BRIEF DESCRIPTION OF THE DRAWINGS

FIG. 1 is a fragmentary schematic partly elevational and partly axial sectional view of a roll which embodies one form of the invention and can be utilized in calenders or like machines; and FIG. 2 is similar fragmentary schematic partly elevational and partly axial sectional view of a modified roll wherein the means for varying the temperature of the shell employs throttles in the first and third channels.

DESCRIPTION OF PREFERRED EMBODIMENTS

FIG. 1 shows a portion of a roll which can be used as a means for heating or cooling a running web (not shown) of paper or the like. The roll comprises a hollow cylindrical shell 1 which surrounds a stationary carrier 2 and confines a cylindrical displacing element 8 mounted on the carrier 2. The end portions 3 of the shell 1 have end faces 3a and the shell is provided with a set (only two shown in FIG. 1) of first channels 4 in the form of bores extending in exact or at least substantial parallelism with the axis X—X of the roll. Each channel 4 which is machined into or is otherwise formed in the end face 3a of the left-hand end portion 3 is or can be coaxial with a channel 4 which is machined into or is otherwise formed in the end face 3a of the right-hand end portion 3 of the shell 1 shown in FIG. 1. Each of the two illustrated channels 4 communicates with a second channel 5 which serves to deliver a heating or cooling (conditioning) fluid (e.g., a liquid such as oil) into the respective channel 4, and with a third channel 6 which serves to evacuate or remove spent heating or cooling fluid from the respective channel 4. The second and third channels 5, 6 extend at least substantially radially of the shell 1, i.e., the extensions of their axes intersect or are at least close to the axis X—X. The means for varying the temperature of the end portions 3 further comprises two adjustable throttles 7, one in each of the illustrated axially parallel first channels 4 and each movable axially of the respective channel 4 to thereby influence the rate of flow of freshly supplied fluid from the left-hand channel 5 into the left-hand channel 4 and/or from the right-hand channel 4 into the right-hand channel 6 of FIG. 1. Each throttle 7 can be provided with an external thread 7a in mesh with a complementary internal thread of the shell 1 so that rotation of a selected throttle 7 results in axial movement of such throttle in the respective channel 4. Any conventional tool can be used to enter the open end of a channel 4 and to have its working end enter a slot or another suitable recess in the adjacent end face of the respective throttle 7.

The displacing element 8 which is installed in the internal space 9 surrounded by the internal surface 1a of the shell 1 is provided with two second throttles or flow restrictors 11 which regulate the rate of flow of a heating or cooling fluid from one end portion 3 toward the other end portion 3 of the shell 1, i.e., in at least substantial parallelism with the axis X—X. Fresh fluid can enter the internal space 9 through one end portion of the carrier 2, and spent fluid can leave the space 9 through the other end of this carrier. The radially inner end portions of the radially extending second and third channels 5, 6 terminate at the internal surface 1a of the shell 1, and the radially outer end portions of the second and third channels 5, 6 communicate with the respective first channels 4.

In order to prevent uncontrolled heating or cooling of the end portions 3 by the fluid which enters the left-hand portion and leaves through the right-hand portion of the space 9, the internal surface 1a of the shell 1 is or can be coated with a relatively thin layer 10 of thermally insulating material, e.g., a layer of suitable plastic material. The second throttles 11 on the displacing element 8 serve to ensure that the heating or cooling fluid which is admitted into the left-hand end portion of the space 9 encounters an optimal resistance to the flow toward and out of the right-hand axial end of such space 8 and is maintained at a requisite pressure. Each of the second throttles 11 can constitute or resemble a ring which is applied to the peripheral surface of the displacing element 8. It is equally possible to provide at least one second throttle in that portion of the path for the heating or cooling fluid which is defined by the left-hand and/or by the right-hand end portion of the carrier 2, i.e., outside of the space 9. Each of the two illustrated second throttles 11 is disposed between a second channel 5 and a third channel 6, as seen in the axial direction of the roll and its sleeve 1. It is equally possible to install the second throttles 11 on the shell 1, i.e., such second throttles need not touch the displacing element 8. The extent of axial flow of heating or cooling fluid in the respective first channels 4 depends upon the selected positions of the respective first throttles 7.

FIG. 2 shows a portion of a somewhat modified roll. All such parts which are identical with or clearly analogous to the corresponding parts of the roll of FIG. 1 are denoted by similar reference characters. The displacing element 8 of FIG. 1 is replaced by a set of, for example, hydrostatic displacing elements 12 which can be used to adjust the shape of the shell 1 in a manner well known from the art of rolls for calenders and like machines. Reference may be had, for example, to commonly owned U.S. Pat. No. 4,964,202 granted Oct. 23, 1990 to Josef Pav et al. for "Heatable roll for use in calenders and the like." The disclosure of this patent is incorporated herein by reference. Furthermore, the shell 1 of the roll which is shown in FIG. 2 is provided with at least one elongated first channel 44 which extends in parallelism with the axis X—X all the way from the end face 3a of the left-hand end portion 3 to the end face 3a of the right-hand end portion 3 of the shell 1. Each of the radially extending second and third channels 5, 6 communicates with the centrally extending bore or hole 13 of a discrete tubular member 14 installed between the carrier 2 and the internal surface 1a of the shell 1.

The elongated first channel 4 which is shown in FIG. 2 communicates with three third channels 6 and with a single second channel 5. The latter is disposed between two channels 6, as seen in the axial direction of the shell 2. As can also be seen in FIG. 2, the axial positions of the first throttles 7 can be selected in such a way that the heating or cooling fluid which is admitted through the single second channel 5 flows in parallelism with the axis X—X not only in a direction toward the end face 3a of the left-hand end portion 3 but also toward the end face 3a of the right-hand end portion of the illustrated channel 4. The shell 1 of FIG. 1 or 2 can be provided with a substantial number of channels 4 or with numerous pairs of coaxial channels 4 (FIG. 1) which may but need not be equidistant from each other (as seen in the circumferential direction of the respective shell 1).

FIG. 2 further shows a throttle 15 which is optional and is shown as being installed in the single second conduit 5. The throttle 15 may but need not be adjustable, and its presently preferred purpose is to ensure satisfactory flow of a heating or cooling fluid, especially in or at least at the end portions 3 of the shell 1 of the roll which is illustrated in FIG. 2.

An important advantage of the improved roll is that it renders it possible to accurately select the heating or cooling action upon the end portions 3 of the shell 1 even though the roll comprises a surprisingly small number of relatively simple parts. Moreover, the roll can be modified in a number of ways without departing from the spirit of the invention. For example, the throttles 7 can be installed in the channels 4, in the channels 5 and/or in the channels 6, as long as they are capable of carrying out their aforediscussed functions of ensuring predictable and reproducible flow of a heating or cooling fluid not only in those portions of the channels 4 which are needed to adequately heat the median portions of the rolls 1 but also in those portions of the channels 4 which must be heated or cooled in order to ensure adequate heating or cooling of the end portions 3 of the shell. It is presently preferred to install the throttles 7 in the channels 4 because such throttles are readily accessible for the purposes of inspection, removal and/or adjustment.

Another important advantage of the improved roll is that a single heating or cooling fluid suffices to ensure adequate conditioning of the median portion and/or of the end portions 3 of a shell 1. This contributes to simplicity and hence to lower initial and maintenance cost of the improved roll. Still further, the throttles 7 can be manipulated to ensure a highly accurate adjustment of the rate of flow of a single body of fluid in the channels 4 and hence a predictable cooling of all portions of the shell.

An advantage of the feature that the throttles 7 are installed in the respective channels 4 between the end faces 3a and the nearest channels 5 or 6 is that such throttles can be reached and adjusted by resorting to simple (e.g., readily available elementary) tools in order to change the axial positions of such throttles in the respective bores 4.

A further important advantage of the improved conditioning (heating or cooling) system is its versatility. Thus, this system can be installed with advantage in rolls (FIG. 1) which do not employ any hydrostatic and/or other supporting elements (such as the elements 12 in FIG. 2) as well as in rolls (FIG. 2) which do not or need not employ a displacing element (such as 8).

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A roll comprising a shell rotatable about a predetermined axis and having first and second end portions; and means for varying the temperature of at least one of said end portions, said means for varying the temperature comprising at least one first channel provided in said shell and extending in substantial parallelism with said axis, at least one second channel provided in said shell to admit a conditioning fluid into said at least one first channel, at least one third channel provided in said shell to receive conditioning fluid from said at least one first channel, and at least one adjustable throttle in at least one of said channels.

2. The roll of claim 1, wherein said shell has an internal surface and said second and third channels extend between said internal surface and said at least one first channel substantially radially of said axis.

3. The roll of claim 1, wherein one of said at least one second channel and at least one third channel is nearer to said at least one end portion than the other of said at least one second channel and the at least one third channel, said at least one first channel having a portion provided in said at least one end portion and said at least one throttle being disposed, at least in part, in said portion of said at least one first channel.

4. The roll of claim 1, wherein said shell and said at least one throttle include complementary means for moving said at least one throttle in said at least one first channel in response to rotation of said at least one throttle in the general direction of said axis.

5. The roll of claim 1, wherein said shell has an internal surface surrounding a space and further comprising a displacing element provided in said shell, defining with space with said internal surface, surrounding said element and defining a path for the flow of a conditioning fluid substantially in the direction of said axis.

6. The roll of claim 1, wherein said shell has an internal surface and further comprising a thermally insulating liner overlying said internal surface at least at said at least one end portion.

7. The roll of claim 1, wherein said shell has an internal surface and further comprising a displacing element provided in said shell and defining with said internal surface an internal space surrounding said element, and at least one flow restrictor provided in said space between said at least one second and at least one third channel, as seen in the direction of said axis.

8. The roll of claim 1, wherein said shell has a first end face at said first end portion and a second end face at said second end portion, said at least one first channel extending between said end faces.

9. The roll of claim 1, wherein said shell has one second channel and three third channels for said at least one first channel.

10. The roll of claim 9, wherein said one second channel is disposed between two of said third channels, as seen in the direction of said axis.

11. The roll of claim 9, further comprising a second throttle in one of said third channels.

12. The roll of claim 11, wherein said one third channel is disposed between two other second and third channels as seen in the direction of said axis.

13. The roll of claim 1, wherein said shell has at least one additional second channel and at least one additional third channel at the other of said end portions.

14. The roll of claim 1, further comprising a stationary carrier surrounded by said shell.

* * * * *